United States Patent
Tsai et al.

(10) Patent No.: US 9,202,203 B2
(45) Date of Patent: Dec. 1, 2015

(54) METHOD FOR CLASSIFYING EMAIL

(75) Inventors: Meng-Feng Tsai, Taoyuan County (TW); Min-Feng Wang, Kaohsiung (TW); Hsiao-Kuang Wu, Taoyuan County (TW); Sie-Long Jheng, Hsinchu County (TW); Hsin-Fu Su, Yunlin County (TW); Cheng-Hsien Tang, Taipei (TW); Chi-Sheng Huang, Changhua County (TW)

(73) Assignee: National Central University, Taoyuan (TW)

( * ) Notice: Subject to any disclaimer, the term of this patent is extended or adjusted under 35 U.S.C. 154(b) by 328 days.

(21) Appl. No.: 13/542,685

(22) Filed: Jul. 6, 2012

(65) Prior Publication Data
US 2013/0179516 A1  Jul. 11, 2013

(30) Foreign Application Priority Data

Jan. 6, 2012   (TW) .............................. 101100593 A

(51) Int. Cl.
G06F 15/16   (2006.01)
G06Q 10/10   (2012.01)
H04L 12/58   (2006.01)

(52) U.S. Cl.
CPC .............. *G06Q 10/107* (2013.01); *H04L 51/00* (2013.01)

(58) Field of Classification Search
CPC ............................ H04L 12/58; H04L 12/5855
USPC ........................................................ 709/206
See application file for complete search history.

(56) References Cited

U.S. PATENT DOCUMENTS

2006/0085504 A1*  4/2006  Yang et al. .................... 709/206
2010/0017487 A1*  1/2010  Patinkin ......................... 709/206

OTHER PUBLICATIONS

Enrico Blanzieri; Anton Bryl (A survey of learning-based techniques of email spam filtering); Jul. 10, 2009; pp. 63-84.*
Wang et al (Enterprise Email Classification Based on Social Network features); pp. 532-536; Jul. 25-27, 2011.*
Tyler, J. R., Wilkinson, D. M. and Huberman, B. A. Email as spectroscopy: Automated discovery of community structure within organizations. The Information Society, 21, 2, 2005, 133-141.
Yelupula, K. and Ramaswamy, S. Social network analysis for email classification. Proceedings of the 46th Annual Southeast Regional Conference, 2008, 469-474.
Shetty, J. and Adibi, J. The Enron Email dataset database schema and brief statistical report. Retrieved Nov. 4, 2004.
Twining, R. D., Williamson, M. M., Mowbray, M., and Rahmouni, M. Email prioritization: Reducing delays on legitimate mail caused by junk mail. Proceedings of the USENIX Annual Technical Conference, 2004, 45-58.
Chirita, P-A, Diederich, J. and Nejdl, W. MailRank: Using ranking for spam detection. Proceedings of the ACM CIKM Conference on Information and Knowledge Management, 2005, 373-380.

(Continued)

*Primary Examiner* — Yves Dalencourt
(74) *Attorney, Agent, or Firm* — CKC & Partners Co., Ltd.

(57) ABSTRACT

A method for classifying email includes receiving an email. Several recipient email accounts of the email are extracted. Several email feature values of the email are generated according to the recipient email accounts. A classification algorithm is utilized to classify the email as an official email or a private email according to the email feature values of the email.

12 Claims, 2 Drawing Sheets

(56) References Cited

OTHER PUBLICATIONS

Li Z, Shen H. SOAP: a social network aided personalized and effective spam filter to clean your e-mail box. In: Proceedings of the IEEE international conference on computer communications; 2011. p. 1835-43.

Stolfo SJ, Hu C-W, Li W-J. Combing behavior models to secure email systems. Columbia University Technical report; Apr. 2003.

Okolica JS, Peterson GL and Mills RF. Using PLSI-U to detect insider threats by datamining email. International Journal of Security and Networks 2008;3(2):114-21.

Fisher, D., Brush, A. J., Hogan, B., Smith, M., and Jacobs, A. Using social metadata in email triage: Lessons from the field. Proceedings of the 2007 Conference on Human-Computer Interaction, 2007, 13-22.

Yang, Y., Yoo, S., Lin, F., and Moon, I-C. Personalized email prioritization based on content and social network analysis. IEEE Intelligent Systems, 25, 4, Jul. 2010, 12-18.

Yoo, S., Yang, Y., Lin, F., and Moon, I-C. Mining social networks for personalized email prioritization. Proceedings of the 15th Conference on Knowledge Discovery and Data Mining, 2009, 967-976.

Tseng, C-Y, Huang, J-W, and Chen, M-S. ProMail: Using progressive email social network for spam detection. Proceedings of the Pan-Asia Conference on Knowledge Discovery and Data Mining, 2007, 833-840.

Tseng, C-Y and Chen M-S. Incremental SVM model for spam detection on dynamic email social networks. Proceedings of the IEEE International Conference on Computational Science and Engineering, 2009.

Stolfo S J., Hershkop S, Hu C-W, Li W-J, Nimeskern O, Wang K. Behavior-based modeling and its application to Email analysis, ACM Transactions on Internet Technology 2006;(2) URL:http://dl.acm.org/citation.cfm?id=1149125.

Neustaedter C, Brush A. J. Bernheim, Smith M, Beyond "From" and "Received": Exploring the Dynamics of Email Triage, In: Proceedings of the 2005 conference on human factors in computing systems; 2005, pp. 1977-1980. URL: http://dl.acm.org/citation.cfm?id=1057071.

Neustaedter, C, Brush, A. J. Bernheim, Smith, M and Fisher, D, The social network and relationship finder: social sorting for email triage, In: Proceedings of the Second Conference on Email and Anti-Spam; 2005. URL:http://citeseerx.ist.psu.edu/viewdoc/summary?doi=10.1.1.86.7224.

Hall M, Frank E, Holmes G, Pfahringer B, Reutemann P, Witten I H. The WEKA data mining software: an update. ACM SIGKDD Explorations Newsletter, vol. 11, Issue 1, pp. 11-18, 2009. URL:http://dl.acm.org/citation.cfm?id=1656278.

Yasser El-Manzalawy and Vasant Honavar, WLSVM : Integrating LibSVM into Weka Environment, 2005. Software available at http://www.cs.iastate.edu/~yasser/wlsvm.

W-Y Ma, K-J Chen, Introduction to CKIP Chinese word segmentation system for the first international Chinese word segmentation bakeoff, Proceedings of the second SIGHAN workshop on Chinese language processing, pp. 168-171, 2003. URL: http://dl.acm.org/citation.cfm?id=1119276.

Cross-validation (statistics), From Wikipedia, the free encyclopedia URL: http://en.wikipedia.org/wiki/Cross-validation_(statistics).

C. Cortes, V. Vapnik, Support-Vector Networks, Machine Learning, vol. 20, Issue 3, pp. 273-297, 1995. URL:http://link.springer.com/article/10.1023%2FA%3A1022627411411.

Support vector machine (SVM), From Wikipedia, the free encyclopedia URL: http://en.wikipedia.org/wiki/Support_vector_machine (This page was last modified on Apr. 30, 2014 ).

* cited by examiner

METHOD FOR CLASSIFYING EMAIL

RELATED APPLICATIONS

This application claims priority to Taiwan Application Serial Number 101100593, filed Jan. 6, 2012, which are herein incorporated by reference.

BACKGROUND

1. Technical Field

The present invention relates to a method for classifying email.

2. Description of Related Art

As multimedia and network technology becomes popular, email attachments containing large multimedia data files are becoming more and more common. For many companies, it is often outgoing private emails that include large files as attachments. In addition to straining the resources of email servers, such behavior also increases internal communication costs in an enterprise. Enterprises must thus focus on preventing outgoing private emails from overburdening the email system so that company resources can be utilized more efficiently.

In the prior art, in order to determine if email is sent for official purposes, the contents of emails may be monitored. Such monitoring may lower email transmission efficiency, and in addition, may make employees feel that their privacy is being violated. Hence, it is a challenge to classify emails accurately into official and private emails without performing some form of monitoring.

SUMMARY

According to one embodiment of this invention a method for classifying email is provided to generate several feature values of an email according to its recipient email accounts, and to classify the email as an official email or a private email according to the feature values. The method for classifying email may take the form of a computer program product stored on a computer-readable storage medium having computer-readable instructions embodied in the medium. The method for classifying email includes the following steps:

(a) an email is received.

(b) several recipient email accounts of the email are extracted from the email.

(c) several email feature values of the email are generated according to the recipient email accounts.

(d) a classification algorithm is utilized to classify the email as an official email or a private email according to the email feature values of the email.

The present invention can achieve many advantages. Since the contents of emails are not monitored, persons whose emails are classified do not feel that their privacy is being violated. In some embodiments, the method for classifying email can be implemented utilizing ARM-based embedded systems with Universal Plug and Play (UPnP), in which the ARM-based embedded systems can provide an email classifying function. Hence, when ARM-based embedded systems are set up in a network environment, the ARM-based embedded systems can classify the emails transmitted through the same.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
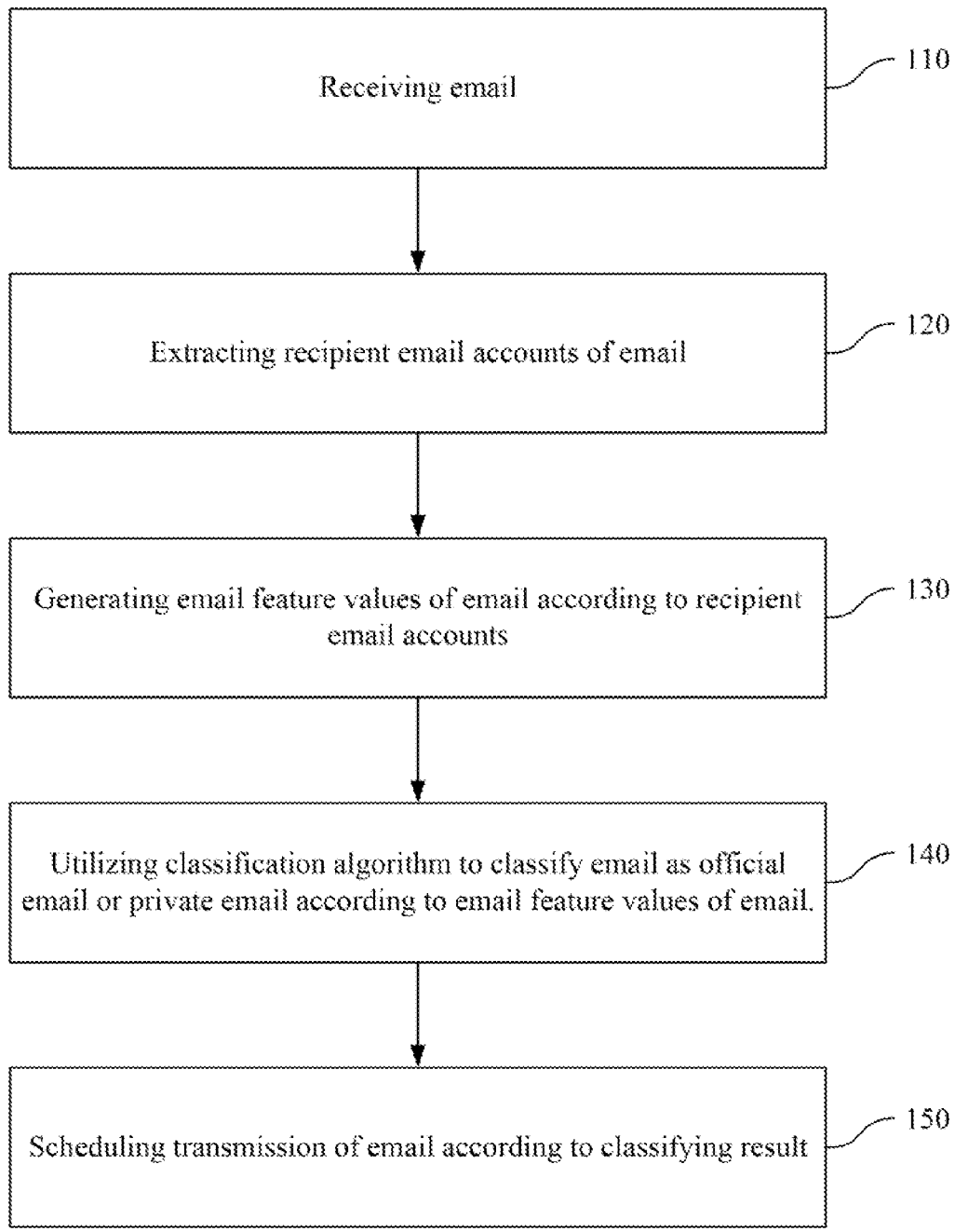
FIG. 1 is a flow diagram of a method for classifying email according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for classifying email according to one embodiment of this invention. In the method for classifying email, several feature values of an email are generated according to its recipient email accounts, and the email is classified as an official email or a private email according to the feature values. The method for classifying email may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The method for classifying email 100 includes the following steps:

At step 110, an email is received.

At step 120, several recipient email accounts of the email are extracted from the received email. In one embodiment of this invention, the fields, such as the "To" field, "carbon copy (cc)" field, "blind carbon copy (bcc)" field, etc., can be extracted from the header of the received email for use as the recipient email accounts.

At step 130, several email feature values of the received email are generated according to the recipient email accounts.

In one embodiment of step 130, a number of at least one recipient domain name which is associated with the recipient email accounts may be analyzed. Subsequently, a recipient-domain-name feature value may be generated according to the number of the at least one recipient domain name and the number of the recipient email accounts. Hence, the recipient-domain-name feature value can be used as one of the email feature values. In some embodiments, the number of the at least one recipient domain name divided by the number of the recipient email accounts is used as the recipient-domain-name feature value. For example, if there are two recipient email accounts extracted at step 120 and these two recipient email accounts are at two different domain names, the recipient-domain-name feature value is 2/2=1. In other embodiments, other formulas may be utilized to generate the recipient-domain-name feature value according to the number of the at least one recipient domain name and the number of the recipient email accounts, which should not be limited in this disclosure.

In another embodiment of step 130, an official email social network, which includes several official email accounts, can be provided. Subsequently, a determination is made as to whether there is a relation between the official email accounts and the recipient email accounts. For example, a determination is made as to whether the contact lists of the official email accounts contain any of these recipient email accounts. If one of the contact lists of the official email accounts contains one of the recipient email accounts, it is determined that a relation exists between the contact list and the recipient email account. Hence, a relation feature value can be generated according to the relation for use as one of the email feature values. For example, if two recipient email accounts are extracted at step 120 and these two recipient email accounts are both in the contact list of one official email account "leo@leo.com," the relation feature value may be (1+1)/2=1, which is generated according to the relation.

In another embodiment of this invention, a logarithm function may be further utilized for calculating the relation feature value. The formula for the logarithm function may be as follows:

$$InDegreeCent(m_i) = \log\frac{\sum \forall r_{ij} \in (NE_i \wedge V_b)^{deg^-}(r_{ij}) + 1}{\sum \forall r_{ij} \in (NE_i \wedge V_p)^{deg^-}(r_{ij}) + 1}$$

where $InDegreeCent(m_i)$ is the relation feature value of $m_i$, $\Sigma_{\forall r_{ij} \in (NE_i \wedge V_b)} deg^-(r_{ij})$ is the degree of the relation between the recipient email account $r_{ij}$ and the official email social network, and $\Sigma_{\forall r_{ij} \in (NE_i \wedge V_p)} deg^-(r_{ij})+1$ is the degree of the relation between the recipient email account $r_{ij}$ and a social network other than the official email social network. In other embodiments, other formulas may be utilized to generate the relation feature value according to the relation, which should not be limited in this disclosure.

In still another embodiment of step 130, an official social network and at least one private social network may be provided. Subsequently, a number of official recipients among the recipient email accounts belonging to the official social network is determined. In addition, a number of private recipients among the recipient email accounts belonging to the at least one private social network is determined. Subsequently, a relation-rate feature value is generated according to the number of the official recipient's and that of the private recipients. Hence, the relation-rate feature value can be used as one of the email feature values. In some embodiments, the difference between the number of the official recipients and that of the private recipients can be generated as the relation-rate feature value. For example, if there are two recipient email accounts extracted at step 120 and these two recipient email accounts both belong to the at least one private social network (in other words, neither of these two recipient email accounts belongs to the official social network), the relation-rate feature value may be 0−2=2, which is generated according to the number of the official recipients and that of the private recipients.

In another embodiment of this invention, a logarithm function may be further utilized for calculating the relation-rate feature value. The formula for the logarithm function is as follows:

$$OR_{recipient}(m_i) = \log\frac{|V_b \cap r_i| + 1}{|V_p \cap r_i| + 1}$$

where $OR_{recipient}(m_i)$ is the relation-rate feature value of the email $m_i$, $|V_b \cap r_i|$ is the official recipients among the recipient email accounts belonging to the official social network, and $|V_p \cap r_i|$ is the number of private recipients among the recipient email accounts belonging to the at least one private social network.

In another embodiment of this invention, the relation-rate feature value can be calculated utilizing the following formula:

$$OR_{nonemployee}(m_i) = \log\frac{|V_b \cap NE_i| + 1}{|V_p \cap NE_i| + 1}$$

where $OR_{recipient}(m_i)$ is the relation-rate feature value of the email $m_i$, $|V_b \cap NE_i|$ is the number of the recipient email accounts not belonging to employees but belonging to the official social network, and $|V_p \cap NE_i|$ is the number of the recipient email accounts not belonging to employees but belonging to the at least one private social network. In other embodiments, other formulas may be utilized to generate the relation-rate feature value according to the number of the official recipients and that of the private recipients, which should not be limited in this disclosure.

In still other embodiments of step 130, a number of the recipient email accounts that are official email accounts may be determined, and an official-rate feature value may be generated according to the number of the recipient email accounts that are official email accounts. Accordingly, the official-rate feature value is used as one of the email feature values. For example, if there are two recipient email accounts extracted at step 120 and these two recipient email accounts are both official email accounts, the official-rate feature value may be 2/2, which is generated according to the number of the recipient email accounts that are official email accounts. In other embodiments, other formulas may be utilized to generate the official-rate feature value according to the number of the number of the recipient email accounts that are official email accounts, which should not be limited in this disclosure.

At step 140, a classification algorithm is utilized to classify the email as an official email or a private email according to the email feature values of the email. The classification algorithm used may be the Naïve Bayes Classifier, Support Vector Machine (SVM), Neural Network or any other algorithm for classification.

Subsequently, at step 150, transmission of the received email can be scheduled according to the classifying result generated at step 140. For example, a higher transmission priority or bandwidth may be assigned to emails that are official emails, and a lower transmission priority or bandwidth may be assigned to emails that are private emails. Therefore, the contents of emails need not be monitored, such that persons whose emails are classified do not fee that their privacy is being violated during email classification.

Moreover, to further enhance the accuracy rate, key words in the subject of the email may be analyzed. Hence, in the method for classifying email 100, a subject of the received email may be analyzed to extract at least one key word, and a key-word feature value may be generated according to the at least one key word. For example, an official key word database and a private key word database may be provided. Hence, the at least one key word extracted from the subject of the received email may be looked up in the official key word database and the private key word database for generating a key-word feature value. If a plurality of key words are extracted and most of the extracted key words exist in the official key word database, the key-word feature value may be assigned a higher value. On the other hand, if a plurality of key words are extracted and most of the extracted key words exist in the private key word database, the key-word feature value may be assigned a lower value. Subsequently, the classification algorithm may be utilized to classify the email as an official email or a private email according to the email feature values and the key-word feature value of the email at step 140. Therefore, the accuracy rate for email classification can be further enhanced by taking into consideration the subject of the received email.

Figure 2:
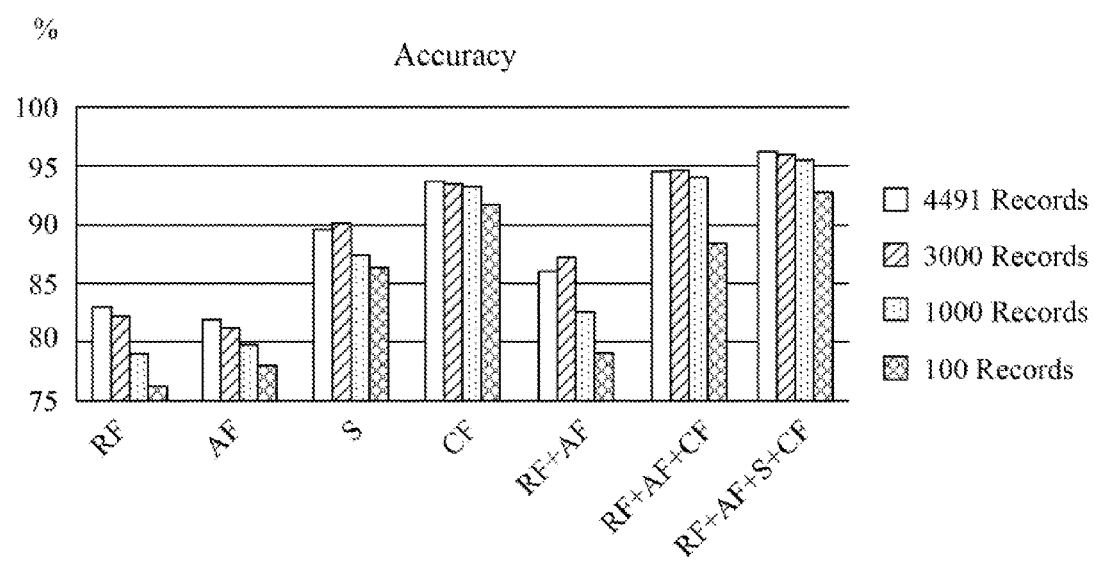
FIG. 2 is a bar chart that illustrates accuracy rates of email classification when the method for classifying email of the present invention is used.

Referring to FIG. 2, a bar chart will be described that illustrates accuracy rates of email classification when the method for classifying email of the present invention is used. All experiments conducted to obtain the results of FIG. 2 were performed on a machine with an Intel® Core™2 Duo Processor E6300 1.86 GHz CPU and a 4 GB RAM, and running on Microsoft Windows XP Professional with SVM to classify 4491, 3000 and 100 emails. RF indicates that the recipient-domain-name feature value is taken into consideration for email classification, AF indicates that the relation feature value or the official-rate feature value is taken into consideration for email classification, CF indicates that the relation-rate feature value is taken into consideration for email classification, and S indicates that the key-word feature value is taken into consideration for email classification.

As shown in FIG. 2, the accuracy rates when the recipient-domain-name feature value, the relation feature value or the official-rate feature value, and the relation-rate feature value are taken into consideration (RF+AF+CF) are higher than the accuracy rates of most other combinations of feature values. Hence, compared to classifying according to one single feature value, the accuracy rate of the present invention, which classifies the received email with several feature values of recipient email accounts, is higher. In addition, the accuracy rates when the key-word feature value is also taken into consideration (RF+AF+S+CF) are the highest, as shown in the bar chart of FIG. 2.

The present invention can achieve many advantages. Since the contents of emails are not monitored, persons whose emails are classified do not feel that their privacy is being violated. In some embodiments, the method for classifying email can be implemented utilizing ARM-based embedded systems with Universal Plug and Play (UPnP), in which the ARM-based embedded systems can provide an email classifying function. Hence, when ARM-based embedded systems are set up in a network environment, the ARM-based embedded systems can classify the emails transmitted through the same.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for classifying email comprising:
  (a) receiving an email;
  (b) extracting a plurality of recipient email accounts of the email;
  (c) generating a plurality of email feature values of the email according to the recipient email accounts extracted from fields in header of the email; and
  (d) utilizing a classification algorithm to classify the email as an official email or a private email according to the email feature values of the email,
  wherein said generating the email feature values of the email according to the recipient email accounts extracted from fields in header of the email comprises: providing an official email social network which comprises a plurality of official email accounts; determining whether there is a relation between the official email accounts and the recipient email accounts according to a number of the email recipient accounts comprised in contact lists of the official email accounts; and generating a relation feature value according to the relation, wherein the relation feature value is used as one of the email feature values.

2. The method for classifying email of claim 1, wherein said generating the email feature values of the email according to the recipient email accounts extracted from fields in header of the email comprises:
  analyzing a number of at least one recipient domain name associated with the recipient email accounts; and
  generating a recipient-domain-name feature value according to the number of the at least one recipient domain name and the number of the recipient email accounts, wherein the recipient-domain-name feature value is used as one of the email feature values.

3. The method for classifying email of claim 1, wherein said generating the email feature values of the email according to the recipient email accounts extracted from fields in header of the email comprises:
  providing an official social network and at least one private social network;
  determining a number of official recipients among the recipient email accounts belonging to the official social network;
  determining a number of private recipients among the recipient email accounts belonging to the at least one private social network; and
  generating a relation-rate feature value according to the number of the official recipients and the number of the private recipients, wherein the relation-rate feature value is used as one of the email feature values.

4. The method for classifying email of claim 1, wherein said generating the email feature values of the email according to the recipient email accounts extracted from fields in header of the email comprises:
  determining a number of official email accounts among the recipient email accounts; and
  generating an official-rate feature value according to the number of official email accounts, wherein the official-rate feature value is used as one of the email feature values.

5. The method for classifying email of claim 1, further comprising:
  analyzing a subject of the email to extract at least one key word;
  generating a key-word feature value according to the at least one key word, wherein said utilizing the classification algorithm to classify the email as the official email or the private email according to the email feature values of the email comprises:

utilizing the classification algorithm to classify the email as an official email or a private email according to the email feature values and the key-word feature value of the email.

6. The method for classifying email of claim 1, further comprising:

scheduling transmission of the email according to the classifying result.

7. The method for classifying email of claim 1, wherein the classification algorithm is Naïve Bayes Classifier, Support Vector Machine (SVM) or Neural Network.

8. A method for classifying email comprising:
(a) receiving an email;
(b) extracting a plurality of recipient email accounts of the email from fields in header of the email;
(c) providing an official email social network comprising a plurality of official email accounts, counting a number of the email recipient accounts comprised in contact lists of the official email accounts as an official contact recipient number, and generating a plurality of email feature values including a ratio of the official contact recipient number to the recipient number; and
(d) utilizing a classification algorithm to classify the email as an official email or a private email according to the email feature values obtained in said providing the official email social network comprising the official email accounts, counting the number of the email recipient accounts comprised in contact lists of the official email accounts as the official contact recipient number, and generating the email feature values including the ratio of the official contact recipient number to the recipient number.

9. The method for classifying email as claim 8, wherein said providing the official email social network comprising the official email accounts, counting the number of the email recipient accounts comprised in contact lists of the official email accounts as the official contact recipient number, and generating the email feature values including the ratio of the official contact recipient number to the recipient number comprises:

counting a number of domain names associated with the recipient email accounts as a domain name number, counting a number of the recipient email accounts as a recipient number, and generating the email feature values including a ratio of the domain name number to the recipient number.

10. The method for classifying email as claim 8, wherein said providing the official email social network comprising the official email accounts, counting the number of the email recipient accounts comprised in contact lists of the official email accounts as the official contact recipient number, and generating the email feature values including the ratio of the official contact recipient number to the recipient number comprises:

providing an official social network and at least one private social network; and counting a number of the email recipient accounts comprised in the official social network as an official recipient number, counting a number of the email recipient accounts comprised in the private social network as a private recipient number, generating the email feature values including a difference value between the private recipient number and the official recipient number.

11. The method for classifying email as claim 8, wherein said providing the official email social network comprising the official email accounts, counting the number of the email recipient accounts comprised in contact lists of the official email accounts as the official contact recipient number, and generating the email feature values including the ratio of the official contact recipient number to the recipient number comprises:

providing an official email social network comprising a plurality of official email accounts; and counting a number of the email recipient accounts comprised in the official email accounts as an official recipient number, and generating the email feature values including a ratio of the official recipient number to the recipient number.

12. The method for classifying email as claim 8, further comprising:

scheduling transmission of the email according to a transmission priority assigned to the email according to the classifying result.

\* \* \* \* \*